(12) United States Patent
Tuma et al.

(10) Patent No.: US 10,780,381 B2
(45) Date of Patent: Sep. 22, 2020

(54) PATTERN COATED FILTER AND METHOD

(71) Applicant: Donaldson Company, Inc., Minneapolis, MN (US)

(72) Inventors: Daniel L. Tuma, St. Paul, MN (US); Ryan M. Callahan, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 191 days.

(21) Appl. No.: 15/560,960

(22) PCT Filed: Mar. 22, 2016

(86) PCT No.: PCT/US2016/023544
§ 371 (c)(1),
(2) Date: Sep. 22, 2017

(87) PCT Pub. No.: WO2016/154182
PCT Pub. Date: Sep. 29, 2016

(65) Prior Publication Data
US 2018/0111074 A1    Apr. 26, 2018

Related U.S. Application Data

(60) Provisional application No. 62/137,037, filed on Mar. 23, 2015.

(51) Int. Cl.
*B01D 53/22*    (2006.01)
*B01D 46/00*    (2006.01)
(Continued)

(52) U.S. Cl.
CPC ....... *B01D 46/0001* (2013.01); *B01D 39/163* (2013.01); *B01D 46/0032* (2013.01);
(Continued)

(58) Field of Classification Search
CPC ........ B01D 46/0036; B01D 2239/0407; B01D 2239/0435; B01D 46/0032;
(Continued)

(56) References Cited

U.S. PATENT DOCUMENTS

| 4,455,187 A | 6/1984 | Von Bluecher et al. |
| 4,510,193 A | 4/1985 | Blucher et al. |

(Continued)

FOREIGN PATENT DOCUMENTS

| CN | 202823003 U | 3/2013 |
| JP | 2004-313606 A | 11/2004 |

(Continued)

OTHER PUBLICATIONS

Geometric_dictionary Collins English Dictionary—Complete and Unabridged, 1 page, 12th Edition 2014 HarperCollins Publishers https://www.thefreedictionary.com/geometric (Year: 2014).*

(Continued)

*Primary Examiner* — Anthony R Shumate
(74) *Attorney, Agent, or Firm* — Mueting Raasch Group

(57) ABSTRACT

The present technology is generally related to a filter assembly. The filter assembly has a first layer has a base layer defining a first perimeter region and a region central to the first perimeter region. A first adhesive is disposed on a first surface of the first layer substantially within the central region, and first adsorbent beads are coupled to the first adhesive. A second layer has a first sheet of filter material having a second perimeter region, wherein the first perimeter region and the second perimeter region are bonded. A third layer has a second sheet of filter material having a third perimeter region, wherein the first perimeter region and the third perimeter region are bonded. The base layer, second layer, and third layer are substantially coextensive.

20 Claims, 8 Drawing Sheets

(51) Int. Cl.
*B01D 53/04* (2006.01)
*B01J 20/10* (2006.01)
*B32B 7/14* (2006.01)
*B32B 5/02* (2006.01)
*B32B 5/26* (2006.01)
*B32B 27/32* (2006.01)
*B32B 5/08* (2006.01)
*B32B 27/12* (2006.01)
*B32B 3/06* (2006.01)
*B01J 20/28* (2006.01)
*B01J 20/32* (2006.01)
*B32B 37/12* (2006.01)
*B32B 7/05* (2019.01)
*B01D 39/16* (2006.01)
*B01D 46/54* (2006.01)
*B01J 20/20* (2006.01)
*B32B 7/12* (2006.01)

(52) U.S. Cl.
CPC ....... *B01D 46/0036* (2013.01); *B01D 46/543* (2013.01); *B01D 53/0407* (2013.01); *B01J 20/103* (2013.01); *B01J 20/20* (2013.01); *B01J 20/28004* (2013.01); *B01J 20/2805* (2013.01); *B01J 20/28011* (2013.01); *B01J 20/3223* (2013.01); *B32B 3/06* (2013.01); *B32B 5/022* (2013.01); *B32B 5/024* (2013.01); *B32B 5/026* (2013.01); *B32B 5/08* (2013.01); *B32B 5/26* (2013.01); *B32B 7/05* (2019.01); *B32B 7/12* (2013.01); *B32B 7/14* (2013.01); *B32B 27/12* (2013.01); *B32B 27/322* (2013.01); *B32B 37/12* (2013.01); *B32B 37/1292* (2013.01); B01D 2239/0407 (2013.01); B01D 2239/0435 (2013.01); B01D 2239/083 (2013.01); B01D 2253/102 (2013.01); B01D 2253/106 (2013.01); B01D 2257/708 (2013.01); B01D 2257/80 (2013.01); B01D 2258/06 (2013.01); B01D 2275/10 (2013.01); B01D 2279/45 (2013.01); B32B 2255/00 (2013.01); B32B 2255/02 (2013.01); B32B 2255/26 (2013.01); B32B 2262/0246 (2013.01); B32B 2262/0253 (2013.01); B32B 2262/0261 (2013.01); B32B 2262/0276 (2013.01); B32B 2262/14 (2013.01); B32B 2264/102 (2013.01); B32B 2264/104 (2013.01); B32B 2264/108 (2013.01); B32B 2264/12 (2013.01); B32B 2307/20 (2013.01); B32B 2307/31 (2013.01); B32B 2307/726 (2013.01); B32B 2309/10 (2013.01); B32B 2429/02 (2013.01); B32B 2581/00 (2013.01)

(58) Field of Classification Search
CPC ............ B01D 2279/45; B01D 46/0001; B01D 39/163; B01D 53/0407; B01D 2239/083; B01D 2275/10; B01D 2253/102; B01D 46/543; B32B 37/12; B32B 2255/00; B32B 5/026; B32B 7/12; B01J 20/20; B01J 20/28011; B01J 20/28004; B01J 20/103
See application file for complete search history.

(56) References Cited

U.S. PATENT DOCUMENTS

| | | | |
|---|---|---|---|
| 4,830,643 A | 5/1989 | Sassa et al. | |
| 4,983,192 A | 1/1991 | Blucher et al. | |
| 5,124,177 A * | 6/1992 | Kasmark, Jr. | B01D 39/12 118/63 |
| 5,338,340 A * | 8/1994 | Kasmark, Jr. | B01D 39/1623 55/486 |
| 5,350,443 A * | 9/1994 | von Blucher | B01D 39/083 55/524 |
| 5,538,545 A | 7/1996 | Dauber et al. | |
| 5,869,009 A | 2/1999 | Bellefeuille et al. | |
| 5,997,618 A | 12/1999 | Schneider et al. | |
| 6,077,335 A | 6/2000 | Schneider et al. | |
| 6,099,609 A * | 8/2000 | Lira | B01D 46/26 55/400 |
| 6,168,681 B1 | 1/2001 | Bellefeuille et al. | |
| 6,214,095 B1 | 4/2001 | Logan et al. | |
| 6,227,383 B1 | 5/2001 | Toernblom et al. | |
| 6,936,094 B2 | 8/2005 | Minemura et al. | |
| 7,354,475 B2 | 4/2008 | Von Bluecher | |
| 7,416,584 B2 | 8/2008 | Hirata | |
| 7,451,497 B2 | 11/2008 | Von Bluecher | |
| 7,704,598 B2 | 4/2010 | Smiley et al. | |
| 8,033,304 B2 | 10/2011 | Tuma et al. | |
| 8,828,227 B2 | 9/2014 | Yamaguchi et al. | |
| 2005/0252379 A1 | 11/2005 | Von Blucher et al. | |
| 2009/0065436 A1* | 3/2009 | Kalayci | B01D 39/1623 210/679 |
| 2013/0219844 A1* | 8/2013 | Sullivan | B01D 46/0001 55/496 |
| 2013/0260100 A1 | 10/2013 | Kelsey et al. | |
| 2015/0053080 A1* | 2/2015 | Boehringer | B01D 53/02 95/90 |
| 2017/0036151 A1* | 2/2017 | Callahan | B01D 46/0032 |
| 2018/0236384 A1* | 8/2018 | Smith | B01D 39/1623 |
| 2018/0236385 A1* | 8/2018 | Jinka | B01D 39/1623 |
| 2018/0236389 A1* | 8/2018 | Jinka | B01D 46/0032 |
| 2018/0243674 A1* | 8/2018 | Gulrez | B01D 39/1623 |

FOREIGN PATENT DOCUMENTS

| | | |
|---|---|---|
| JP | 2006-002730 A | 1/2006 |
| JP | 2015-512347 A | 4/2015 |
| WO | WO 2013/149047 A1 | 10/2013 |
| WO | WO 2014/026175 A1 | 2/2014 |
| WO | 2016154182 | 9/2016 |

OTHER PUBLICATIONS

"International Preliminary Report on Patentability," for PCT Application No. PCT/US2016/023544 dated Oct. 5, 2017 (6 pages).
"International Search Report and Written Opinion," for PCT Application No. PCT/US2016/023544 dated Jun. 2, 2016 (8 pages).

* cited by examiner

PATTERN COATED FILTER AND METHOD

REFERENCE TO RELATED APPLICATIONS

This application is the § 371 U.S. National Stage of PCT International Patent Application No. PCT/US2016/023544, filed on Mar. 22, 2016, which claims the benefist of U.S. Provisional Patent Application No. 62/137,037, filed on Mar. 23, 2015, the disclosures of which are herein incorporated by reference in their entireties.

FIELD OF THE TECHNOLOGY

The present application relates to a filter and method. More specifically, the present application relates to a pattern coated carbon filter.

BACKGROUND

Contaminants within an electronics enclosure, such as a disk drive enclosure, can reduce the efficiency and longevity of the components within the enclosure. Contaminants can include chemicals and particulates, and can enter the electronics enclosure from external sources or can be generated within the enclosure during manufacture or use. The contaminants can gradually damage the electronics, resulting in deterioration in performance and even complete failure. Consequently, electronics enclosures such as hard disk drives typically have one or more filters capable of removing or preventing entry of particulate and/or chemical contaminants in the air within the disk drive enclosure. One type of such filter is a recirculation filter, which is generally placed such that it can filter out contaminants from the path of airflow caused by rotation of one or more disks within the disk drive. Another type of such filter is a breather filter, which is generally placed between the electronics enclosure and the ambient environment to prevent the ingress of contaminants from the environment to the enclosure.

Existing recirculation filters, and some breather filters, typically have an adsorbent that is contained within filtration media. The filtration media filters particle contaminants, and the adsorbent adsorbs chemical contaminants. Manufacturing processes associated with these types of filters can be complex and, as such, simplified processes are needed to manufacture such filters. Furthermore, manufacturing processes that can increase the amount of adsorbent within the filter is desirable.

BRIEF DESCRIPTION OF THE FIGURES

The present application may be more completely understood in connection with the following drawings, in which.

While the present technology is susceptible to various modifications and alternative forms, specifics thereof have been shown by way of example and drawings, and will be described in detail. It should be understood, however, that the current technology is not limited to the particular embodiments described. On the contrary, the intention is to cover modifications, equivalents, and alternatives falling within the spirit and scope of this application.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

The present disclosure generally relates to a filter assembly and a method of manufacturing a filter assembly. The filter assemblies are configured to be disposed within enclosures such as an electronics enclosure to remove contaminants from the enclosure. For example, the filter assembly can be disposed in a disk drive housing that defines an enclosure. In some embodiments, there is at least one disk rotatably mounted within the enclosure. The rotation of the disk induces airflow within the enclosure. At least a portion of the airflow goes through the filter assembly, thereby removing at least a portion of the contaminants within the enclosure. The filter assembly has a first layer, a second layer and a third layer. The filter assembly has adsorbent beads coupled to the first layer and in between the first layer and the second layer. In an embodiment, the filter assembly has adsorbent beads coupled to the first layer and in between the first layer and the third layer, in addition to having adsorbent beads in between the first layer and the second layer.

In some methods of manufacturing filter assemblies, a base layer is provided. The base layer has a first surface and a second surface. An adhesive is printed in a pattern of geometric shapes on the first surface. Adsorbent beads are then deposited on the adhesive to couple the adsorbent beads to the base layer.

Figure 1:
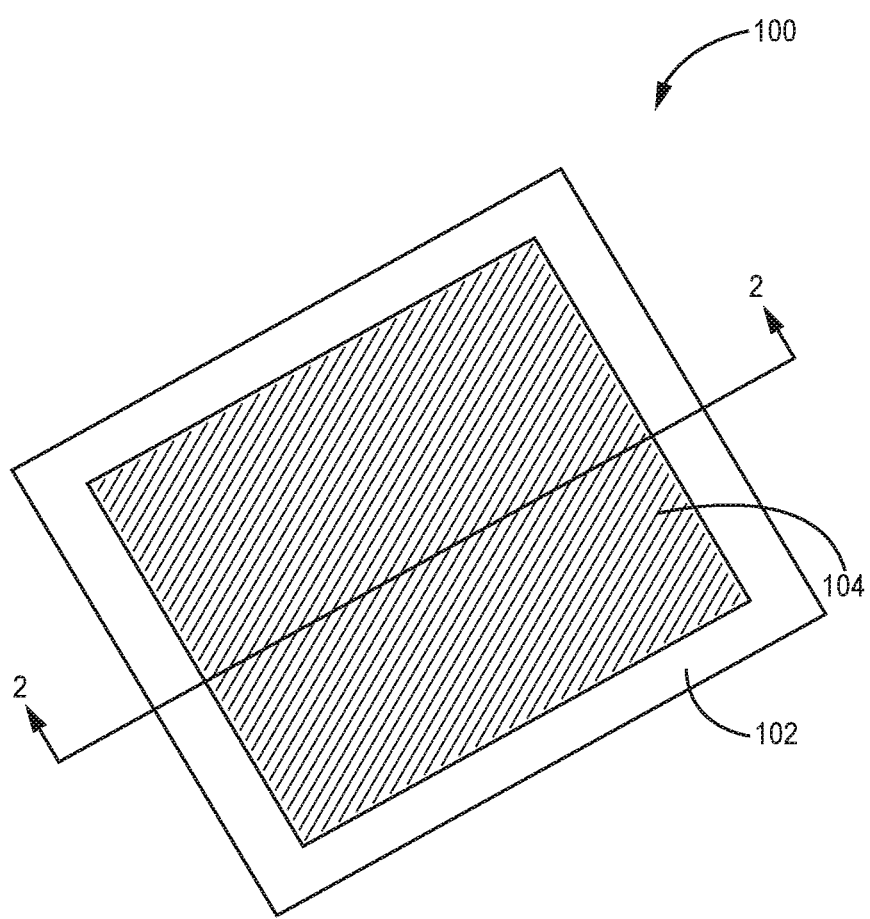
FIG. 1 is a filter assembly consistent with the technology disclosed herein.
Figure 2:
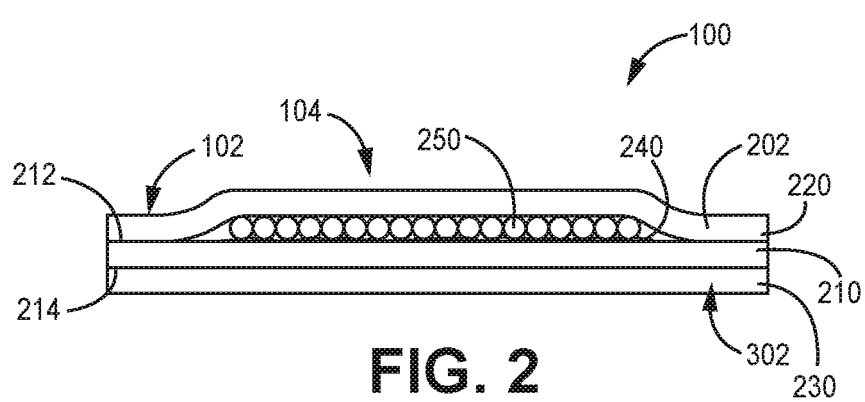
FIG. 2 is a cross-section view of a filter assembly, according to an embodiment.

In reference to the figures, FIG. 1 shows a view of a filter assembly 100 consistent with the technology disclosed herein. FIG. 2 shows a cross-sectional view of the filter assembly 100 along the line 2-2 in FIG. 1. The filter assembly 100 is generally configured to remove contaminants from an enclosure. The filter assembly 100 has multiple layers, such as a base layer and two filter layers. The filter assembly 100 has adsorbent beads disposed between at least two of the layers. In some embodiments, the filter assembly 100 has a first plurality of adsorbent beads disposed between the first layer (the base layer) and the second layer, a second plurality of adsorbent beads disposed between the first layer and the third layer.

Turning to FIG. 2 in particular, the filter assembly has a first layer 210, a second layer 220, a third layer 230, and adsorbent beads 250 disposed between the first layer 210 and the second layer 220. The first layer 210, the second layer 220, and the third layer 230 are substantially coextensive, such that the three layers having substantially similar outer perimeters. "Substantially coextensive" is generally intended to mean that the layers have outer perimeters that are substantially the same shape and size, and that the outer perimeters are substantially aligned with each other.

The first layer 210 can be referred to as a base layer, such as a layer that components or other layers are coupled to. The first layer can be a variety of types of materials and combinations of materials. In at least one embodiment the first layer 210 is a filter media layer, similar to that which will be described below with reference to the second layer 220 and the third layer 230. In a variety of embodiments, the first layer 210 is a scrim material. In some embodiments, the first layer 210 is polymeric. In some embodiments, the first layer 210 is a woven or nonwoven web. In some embodiments the first layer 210 has polypropylene fibers. In some embodiments, the first layer 210 is a knit polyester. The first layer 210 is substantially planar, in a variety of embodiments. The first layer 210 has a first surface 212 and a second surface 214. In one embodiment the first surface 212 and the second surface 214 are generally parallel with each other.

The first layer can have, for example, a permeability of between about 100 ft./min. at 0.5 inches of water and about 800 ft./min. at 0.5 inches of water in some embodiments. In some embodiments the first layer has a permeability of about 250 ft./min. at 0.5 inches of water and about 600 ft./min. at 0.5 inches of water. In yet other implementations the first layer has a permeability of about 300 ft./min. at 0.5 inches of water and about 500 ft./min at 0.5 inches of water, It will be understood that suitable first layer material can have, for example, a permeability of more than 100 ft./min. at 0.5 inches of water; more than 250 ft./min. at 0.5 inches of water; or more than 300 ft./min. at 0.5 inches of water. Suitable first layer material can have, for example, a permeability of less than about 800 ft./min. at 0.5 inches of water in some embodiments; less than 600 ft./min. at 0.5 inches of water in some embodiments; or less than 500 ft./min. at 0.5 inches of water in some embodiments.

The first layer 210 defines a first perimeter region 102 (visible in FIG. 1). The first perimeter region 102 can be the region within which the layers 210, 220, 230 are bonded. The first layer 210 and the second layer 220 are bonded together in the first perimeter region 102. A central region 104 is located within, and is surrounded by, the first perimeter region 102. The central region 104 is generally configured to contain an adsorbent material, such as the adsorbent beads 250.

The filter assembly 100 has a first adhesive 240 disposed on the first surface 212 of the first layer 210 within the central region 104. The first adhesive 240 is generally a non-continuous layer of adhesive. For example, the first adhesive 240 can be non-continuous beads, dots, strips, or lines that are disposed throughout the central region 104. In a variety of embodiments the non-continuous coating of first adhesive 240 collectively defines the shape of the central region 104. The non-continuous nature of the first adhesive 240 allows airflow through the first layer 210. The filter assembly 100 has first adsorbent beads 250 coupled to the first adhesive 240. The first adsorbent beads 250 are coupled to the first adhesive 240 in the central region 104. Generally, a variety of adhesives are acceptable for use as the first adhesive 240 (or the second adhesive). In an embodiment, the adhesive is polyurethane, such as a moisture-cured polyurethane. In some embodiments, the adhesive is a pressure-sensitive adhesive, another type of moisture-cured adhesive, and/or a low outgassing adhesive. In other embodiments the adhesive may be a hot melt adhesive such as, for example, ethylene vinyl acetate (EVA).

The second layer 220 of the filter assembly is generally a sheet of filter material. In an embodiment, the second layer 220 is a membrane, such as PTFE. In some embodiments, the second layer 220 is not a membrane. In some embodiments, the second layer 220 is multiple layers of materials, such as a plurality of layers of different materials. In a variety of embodiments, the second layer 220 is an electrostatic filter media. The third layer 230 is generally a sheet of filter material. The third layer 230 can be the same type of filter material in the second layer 220, or the third layer 230 can be a different type of filter material than the second layer 220. In some embodiments, the third layer 230 is multiple layers of materials, such as a plurality of layers of different materials.

The filter material consistent with the second layer 220 and the third layer 230 can contain various fibers. In one embodiment the filter material is constructed of a mix of fibers such as polypropylene and acrylic fibers. In other embodiments, the filter material is constructed of a single type of fiber or a mix of fibers, which can be free of polypropylene. PTFE fibers, polyester fibers, and/or nylon fibers can also be incorporated in the filter material. The filter material has, for example, a permeability of between about 250 ft./min. at 0.5 inches of water and about 750 ft./min. at 0.5 inches of water. The filter material can have a filtering efficiency of about 20% to about 99.99% for 0.1 to 0.3 micron particulate contaminants in some embodiments. Suitable filter material can, for example, have a filtering efficiency of greater than 20% for 0.1 to 0.3 micron particulate contaminants; greater than 40% for 0.1 to 0.3 micron particulate contaminants; or greater than 60% for 0.1 to 0.3 micron particulate contaminants. The filter material can have in some example implementations a filtering efficiency of less than 99.99% for 0.1 to 0.3 micron particulate contaminants; less than 80% for 0.1 to 0.3 micron particulate contaminants; or less than 60% for 0.1 to 0.3 micron particulate contaminants.

In a variety of embodiments, the filtration material consistent with the technology disclosed herein has electrostatic fibers. The term "electrostatic fibers," as used herein, refers to fibers that are electrostatically charged. One advantage of including electrostatic fibers in the filter assembly 100 is that the filter is not only able to mechanically trap contaminants, but is also able to exert an electrostatic force on contaminants that contain electric charges, thereby increasing the amount of contaminants that are removed from the airstream. The electrostatic media can be triboelectric media, electret media, or any other media that is or can be charged, or that employs electrostatic filtration as a substantial mechanism for particle removal. In example embodiments, the electrostatic media has triboelectric fibers. Triboelectric fibers are known and can be formed, for example, using a mixture of (1) polyolefin fibers such as polyethylene, polypropylene or ethylene and propylene copolymers, with (2) fibers of another polymer, for example, fibers containing hydrocarbon functions substituted by halogen atoms, such as chlorine or polyacrylonitrile fibers. In general, the polyolefin fibers and the other polymer fibers are included in the electrostatic media at a weight ratio between about 60:40 or about 20:80 or about 30:70.

Returning again to FIG. 2, the second layer 220 has a second perimeter region 202 abutting the perimeter edges of the second layer 220. The first perimeter region 102 and the second perimeter region 202 are bonded together. A first weld area can be defined where the first perimeter region 102 and the second perimeter region 202 are bonded together. As such, the first weld area extends around the perimeter of the central region 104 of the filter assembly 100. The first weld area is generally substantially free of adsorbent beads. The welds that bond the layers together can be heat welds, ultrasonic welds, or other types of welds. The third layer 230 has a third perimeter region 302 that is configured to be coupled to the first perimeter region 102. The filter assembly 100 has a second weld area where the first perimeter region 102 and the third perimeter region 302 are bonded together.

The second weld area is substantially coextensive with the first weld area in a variety of embodiments, meaning that the first weld area and the second weld area have inner and outer perimeters that are equally sized and have the same orientation. In various embodiments, the first weld area and the second weld area substantially overlap. In at least one embodiment, the first weld area and the second weld area completely overlap. The second weld area extends around the perimeter of the central region 104. In some embodiments, the first perimeter region 102, the second perimeter region 202 and the third perimeter region 302 define a single weld area. The weld area can bond the first layer 210 with the second layer 220 and/or the third layer 230. In several embodiments, the weld area is a result of heat welding, such as to bond two or more of the layers 210, 220, 230 together.

The first adsorbent beads 250 are coupled to the first layer 210 via the first adhesive 240. The first adsorbent beads 250 can be a variety of different types of adsorbents. The first adsorbent beads 250 are generally configured to adsorb chemical contaminants from the air within the environment of the filter assembly 100. The adsorbent beads can be a physisorbent or chemisorbent material, such as, for example, a desiccant (i.e., a material that adsorbs water or water vapor) or a material that adsorbs volatile organic compounds, acid gas, or both. Suitable adsorbent materials include, for example, activated carbon, activated alumina, molecular sieves, silica gels, potassium permanganate, calcium carbonate, potassium carbonate, sodium carbonate, calcium sulfate, or mixtures thereof.

In some embodiments, the first adsorbent beads 250 are a plurality of carbon beads. The carbon beads can be activated carbon beads. Each of the first adsorbent beads 250 can be substantially spherical in shape, meaning that the first adsorbent beads 250 generally form a sphere, but may have surface aberrations or discontinuities. The first adsorbent beads 250 can range in size from about 0.2 mm to about 1.1 mm, 0.4 mm to about 1.0 mm, and about 0.3 mm to about 0.9 mm. In one embodiment the adsorbent beads will have an average diameter of about 0.3 mm to about 0.8 mm, or about 0.6 mm. In at least one embodiment the density of adsorbent beads disposed on the first layer in the central region is at least about 200 g/m$^2$. In one embodiment the density of adsorbent beads disposed in the central region is at least about 230 g/m$^2$. In one embodiment the density of adsorbent beads disposed in the central region is about 280 g/m$^2$.

The shape of the adsorbent beads is not limited to spheres. The adsorbent beads can substantially define a variety of alternate shapes such as, for example, granules, pellets, ovoids, and other shapes as well as mixtures thereof.

It should be noted that the third layer 230 can be omitted from some embodiments of the technology disclosed herein.

For example, in embodiments where the first layer 210 is a sheet of filter material, the third layer 230 may be omitted from an embodiment otherwise consistent with FIG. 2.

Figure 3:
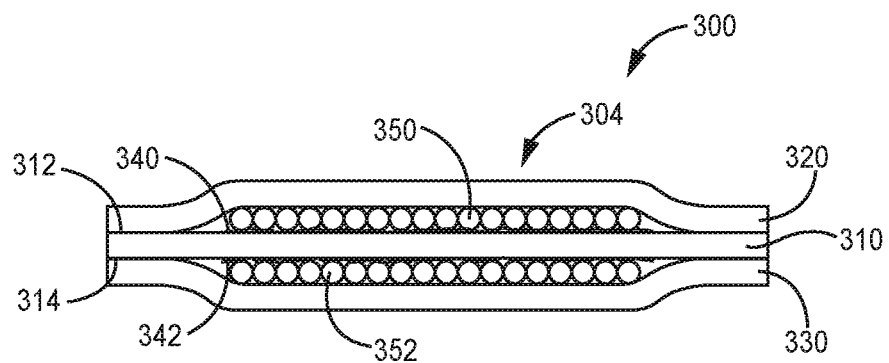
FIG. 3 is a cross-section view of a filter assembly, according to an embodiment.

FIG. 3 shows a cross-sectional view of an alternate embodiment of a filter assembly 300 consistent with the technology disclosed herein. The filter assembly 300 has a first layer 310, a second layer 320, a third layer 330, and adsorbent 350, 352 disposed between the second layer 320 and the third layer 330. The first layer 310, the second layer 320, and the third layer 330 are substantially coextensive. The first layer 310 can be a base layer, such as a layer that components or other layers are coupled to. The first layer 310 has a first surface 312 and a second surface 314.

The filter assembly 300 has a first adhesive 340 disposed on the first surface 312 and a second adhesive 342 disposed on the second surface 314. The first adhesive 340 and the second adhesive 342 are disposed within the central region 304 in a non-continuous manner. The filter assembly 300 has first adsorbent beads 350 coupled to the first adhesive 340, and second adsorbent beads 352 coupled to the second adhesive 342. In some embodiments, the first adhesive 340 and the second adhesive 342 are the same type of adhesive. In alternative embodiments, the first adhesive 340 and the second adhesive 342 are different types of adhesives. Materials that can be used as adhesives are described above with respect to FIGS. 1 and 2.

The first surface 312 of the first layer 310 is directly coupled to the second layer 320. The second surface 314 of the first layer 310 is directly coupled to the third layer 330. The term "directly coupled" is used to mean that the layers are coupled to each other without intervening layers or materials. The first layer 310 is positioned between the second layer 320 and the third layer 330. The first adsorbent beads 350 are disposed between the first layer 310 and the second layer 320. The second adsorbent beads 352 are disposed between the first layer 310 and the third layer 330. In some embodiments, the first adsorbent beads 350 and the second adsorbent beads 352 are the same type of adsorbent beads. In alternative embodiments, the first adsorbent beads 350 and the second adsorbent beads 352 are different types of adsorbent beads. Materials that can be used as adsorbent beads are described above with respect to FIGS. 1 and 2.

Figure 4:
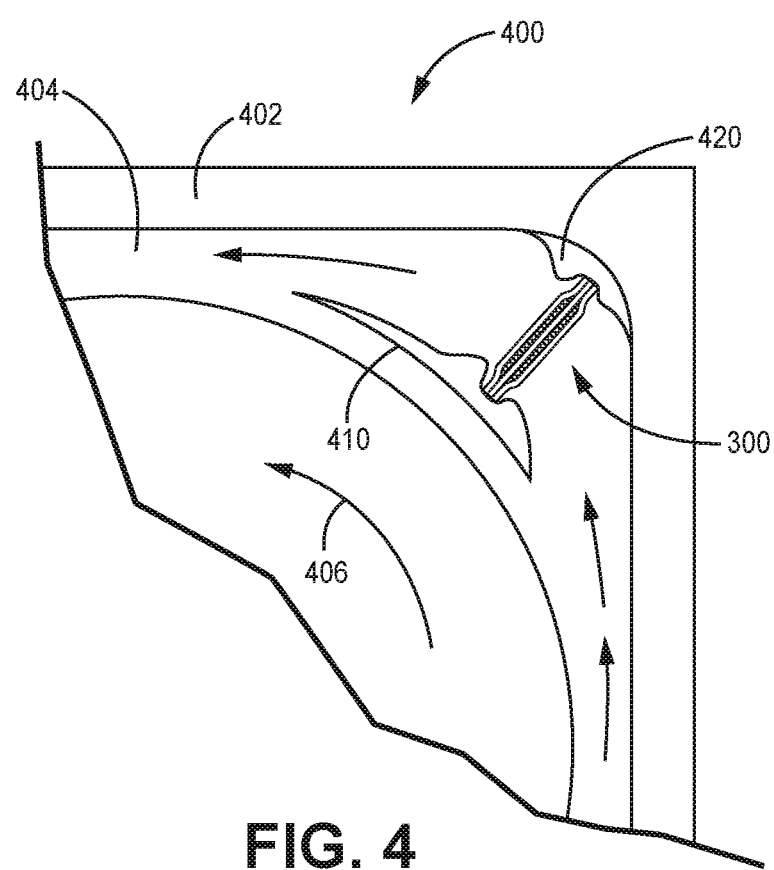
FIG. 4 is a schematic of a partial top plan view of an electronics enclosure containing a filter assembly constructed and arranged in accordance with an example implementation of the currently disclosed technology.

FIG. 4 is a simplified representation of an example implementation of the technology depicted in FIG. 3. The filter assembly 300 is installed in an electronics enclosure that is a disk drive 400. The disk drive 400 has a housing body 402 that defines an enclosure 404. In an example embodiment, at least one disk 406 is rotatably mounted within the enclosure 404. The rotation of the disk is shown by arrows (although opposite rotation is alternatively possible), where the rotation of the disk induces airflow within the enclosure 404. Other disk drive components, such as a read-write head and wiring can be incorporated into the disk drive 400.

The filter assembly 300 has a first layer 310, a second layer 320, a third layer 330 and adsorbent 350, 352 disposed between the second layer 320 and the third layer 330. The filter assembly 300 is oriented so that the surface area of the third layer 330 is facing into the air stream generated by a rotating disk 406 (depicted directionally by arrows). In another embodiment the filter assembly 300 is oriented so that the surface area of the second layer 320 can be facing into the air stream generated by the rotating disk 406. The electronic enclosure 400 has a filter mount 420 that is configured to receive the filter assembly 300. In the embodiment shown, a baffle 410 is present to aid in the direction of air into the third layer 330 of the filter assembly 300, and the baffle 410 at least partially defines the filter mount 420. The filter assembly 300 can be placed within the electronic enclosure such that the baffle 410 directs air into and through the third layer 330. In certain implementations the baffle 410, along with any mounting elements, or other portions of the housing, form a channel that directs air into the third layer 330 (or second layer 320). In other implementations the filter assembly 300 is configured to be positioned in a flowing air stream within an electronics enclosure that lacks a single defined channel directing airflow through the filter assembly 300, or an open-sided channel can be formed within the enclosure that partially directs air through the filter assembly 300. In another example implementation the filter assembly can be used as a breather filter and, as such, can be positioned to block an airflow pathway (not shown) extending between the enclosure 404 and the ambient environment outside the housing body 402.

Figure 5:
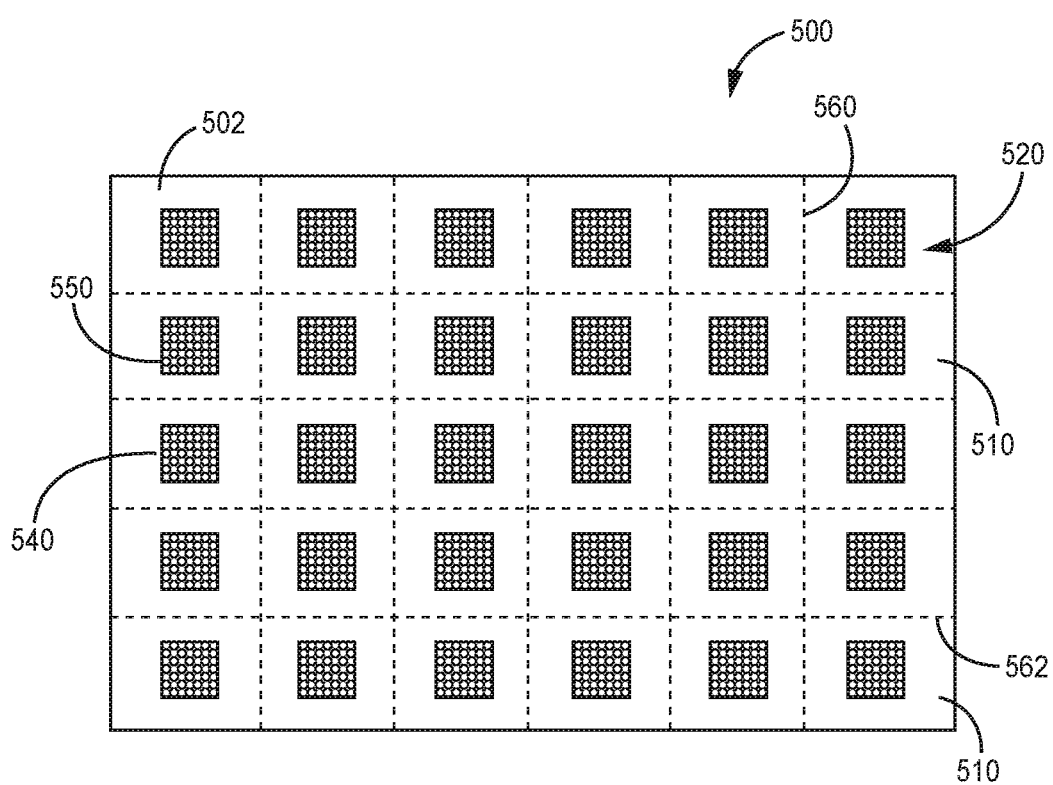
FIG. 5 is sheet of an example manufacturing sub-assembly, according to an embodiment.

FIG. 5 depicts a facing view of a manufacturing sub-assembly 500 according to an embodiment. The sub-assembly 500 is a sheet of base layer material that defines a plurality of conjoined first layer sections 510. The sub-assembly 500 can be created during a manufacturing line, after which each of the first layer sections 510 can be separated from each other to form individual filter assemblies (such as those depicted in FIGS. 1-3), which will be described in more detail herein.

The sub-assembly 500 generally has an elongate sheet of base material 502, which can be consistent with materials described above with reference to the first layer of FIGS. 1-3. Adhesive 540 is disposed in a pattern on the base material 502. The adhesive 540 can define the intended central regions of each of the first layer sections 510 of the sub-assembly 500. The adhesive 540 defines a repetitive geometric shape, such as a square, a rectangle, or a circle (as shown in FIG. 5), where the geometric shape can be consistent with the intended shape and size of the central region of each of the first layer sections 510 of the sub-assembly 500. In some embodiments, each geometric shape has a length from about 0.8 mm to about 100 mm and a width from about 0.8 mm to about 100 mm. In some more particular embodiments, each geometric shape has a length and width each from about 4 mm to about 40 mm. In some such embodiments, each geometric shape has a length and width each from about 6 mm to about 15 mm. In at least one particular embodiment, each geometric shape has a length and width each from about 8 mm to about 10 mm.

In some alternate embodiments, multiple geometric shapes can be consistent with the intended locations of adsorbent beads in a single finished filter element. For example, it may be desirable to couple adsorbent beads to materials used to construct a pleated filter element. However, a pleat tip of a pleated filter element can be an undesirable location for adsorbent beads, since the pleating process could result in crushing and dislodging of the adsorbent beads adjacent to the pleat tip, or a poorly-formed pleat tip.

Returning back to FIG. 5, the geometric shapes are defined by a non-continuous coating of adhesive 540. In a variety of embodiments the plurality of lines or dots of adhesive 540 in the central regions generally defines the particular geometric shapes. The plurality of lines or dots of adhesive can be randomly disposed within each central area, or they can be disposed in a pattern. In some embodiments lines of adhesive defining each geometric shape can be intersecting, such as in a cross-hatching configuration. In some embodiments the adhesive 540 is a plurality of discrete beads that collectively define the geometric shapes, while in other embodiments some of the beads of adhesive can intersect. The non-continuous adhesive within the central regions can define the outer perimeter of the particular geometric shape. The non-continuous adhesive within the central regions can partially fill the area defined by the outer perimeter of the geometric shape, such that there is sufficient adhesive 540 to couple adsorbent beads to substantially fill the area within the outer perimeter of the geometric shape.

The adhesive 540 is disposed on the sheet 502 within each central region of each first layer section 510 and thereby defines perimeter regions 520 between adjacent central regions. In a variety of embodiments, the perimeter regions 520 substantially lack adhesive. Adsorbent beads 550 are coupled to the adhesive 540, thereby coupling the adsorbent beads 550 with the sheet of base material 502. The adhesive 540 and adsorbent beads 550 can be consistent with materials already described herein.

The sheet 502 with the adhesive 540 and adsorbent beads 550 can be cut, excised or otherwise separated into a plurality of first layer sections 510. In at least one embodiment, the plurality of first layer sections 510 are separated by cutting the base material 502 along vertical lines 560 and horizontal lines 562 within the perimeter regions 520 depicted in FIG. 5. Generally, a portion of two vertical lines 560 and a portion of two horizontal lines 562 defines the outmost perimeter of the perimeter region of each individual first layer section 510. The lines 560, 562 can also define the boundary between two adjacent individual filters, which can reduce waste of the filter materials, described in more detail, below.

Figure 6:
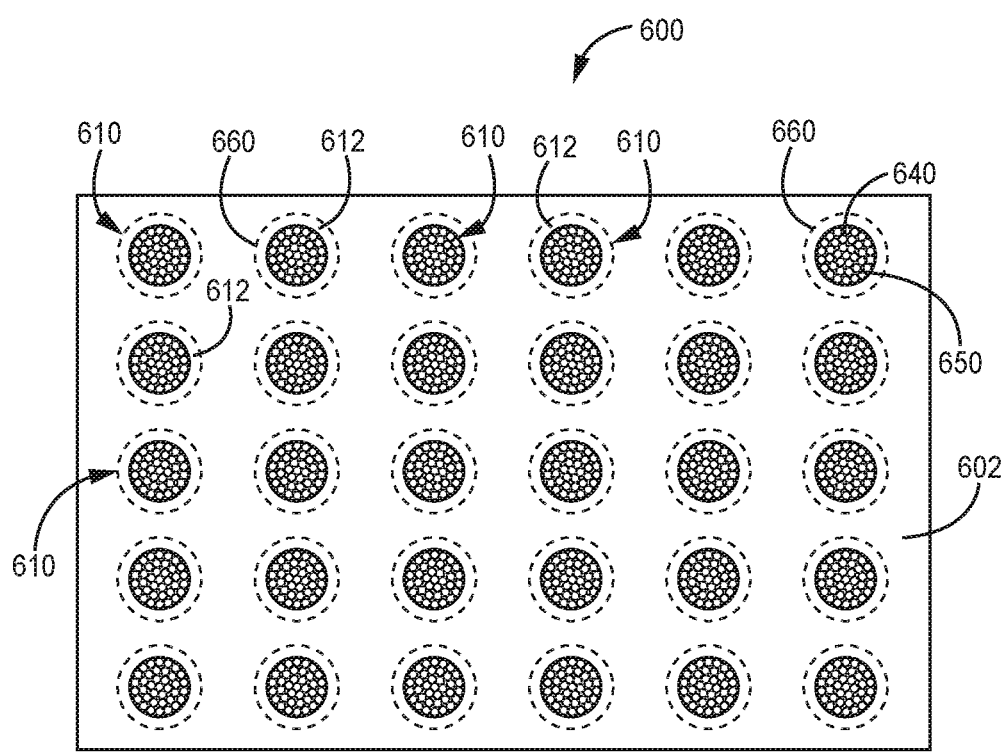
FIG. 6 is sheet of another example manufacturing sub-assembly, according to an embodiment.

FIG. 6 depicts a sub-assembly 600 that is the result of a similar manufacturing method to that used to produce the embodiment depicted in FIG. 5. An elongate sheet 602 of base material defines a plurality of first layer sections 610. The sheet 600 is pattern coated with non-continuous adhesive 640 arranged a circular pattern to define a circular central region. The first layer sections 610 can be divided or separated from each other along separation border 660. Each first layer section 610 has a perimeter region 612 between its separation border 660 and its corresponding central region. In one example method, the sheet 602 can be punched to separate the first layer sections 610 from the elongate base material 602

Figure 7:
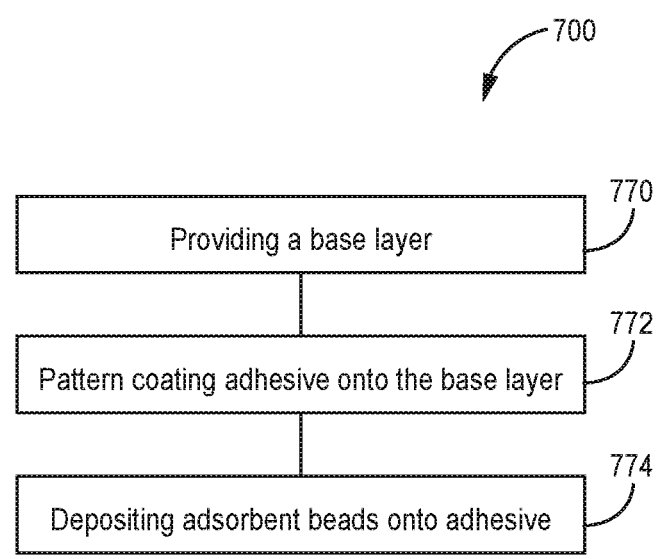
FIG. 7 is a flow chart depicting a method, according to an embodiment.

In some embodiments, the sub-assemblies consistent with FIGS. 5 and 6, and others, are disposed on a roll for storage, transportation, and the like. In such embodiments the elongate base material is wrapped around a core in a substantially spiral configuration, such that one end of the elongate material that was first to be wrapped around the core becomes the inner-most portion of the roll. The opposite end of the elongate material becomes the outer most portion of the spiral configuration of the roll. In some embodiments, the core is cylindrical in shape FIG. 7 is an example flow chart of a method consistent with the sub-assemblies depicted in FIGS. 5-6. A base layer is provided 770, such as a first layer. Adhesive is pattern coated onto the base layer 772. Adsorbent beads are deposited onto the adhesive 774.

In some embodiments, the base layer is provided 770 by unwinding the base layer from a spool around a core. In another embodiment, the base layer is provided 770 by manufacturing the base layer. As described above, the base layer has a first surface and a second surface and can be constructed of materials already described herein.

The adhesive can be pattern coated to the base layer 772 on the first surface of the base layer. In some embodiments, the adhesive is printed onto the base layer. The base layer can be passed through a screen printer that can print the adhesive onto the base layer. The pattern of adhesive has a repeating, discrete pattern of a particular geometric shape. The geometric shape can be, for example, a square, rectangle, triangle, or circle. It will be appreciated by those skilled in the art that additional geometric shapes are also possible. In various embodiments, a second adhesive is pattern coated onto the second, opposite surface of the base layer 772. In some embodiments, the pattern is substantially similar to the pattern coated on the first layer. In some embodiments, the pattern is substantially aligned with the pattern coated on the first layer.

The adsorbent beads are deposited onto the adhesive 774, thereby coupling the adsorbent beads to the base layer. A plurality of adsorbent beads are disposed on the adhesive coating. In the embodiments where a second adhesive is pattern coated onto the second, opposite surface of the base layer 772, a second plurality of adsorbent beads is disposed on the second adhesive. The adsorbent beads are generally substantially dry when brought into contact with the adhesive. By "substantially dry" it is meant that the adsorbent beads are provided without a carrying liquid or without a liquid surrounding the beads and have the capacity to adsorb moisture. In several embodiments, the adsorbent beads have less than 5% water content by weight.

In some embodiments, the adsorbent beads are compressed into the adhesive, such as by translating the base layer, adhesive, and adsorbent beads between two nip rollers. In a variety of embodiments the adhesive can be cured after depositing the adsorbent beads onto the adhesive 774. In some embodiments the adhesive is at least partially cured before depositing the adsorbent beads onto the adhesive 774. The adhesive can be cured through a variety of means that will generally be understood in the art. In one embodiment the adhesive is cured with moisture. In another embodiment the adhesive is cured by letting it cool and dry in ambient conditions. In various embodiments, as described above, the base layer with adhesive and adsorbent beads is wound onto a spool, such as to store the base layer until it is needed for further processing/manufacturing. The base layer can be stored until it is ready to be coupled to or bonded to another layer of material, such as a filter layer.

Figure 8:
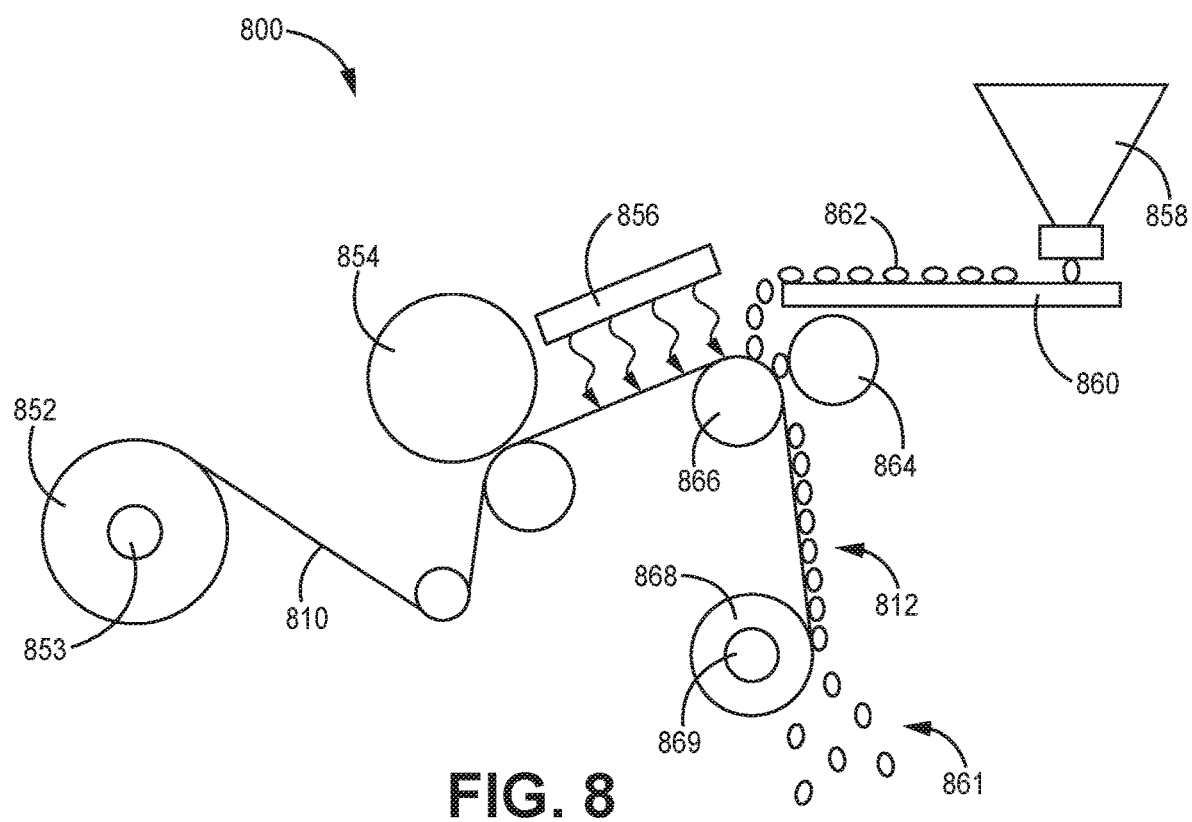
FIG. 8 is a schematic of a manufacturing process, according to an embodiment.

FIG. 8 shows a schematic of a manufacturing line 800 to assemble the base layer, consistent with the method described above with reference to FIG. 7. The manufacturing line 800 at least has a spool 852 of base material 810, an adhesive applicator 854, and a feeding device 860.

The spool 852 is generally configured to provide the base material 810 to the manufacturing line 800. As described above, the spool 852 has a length of base material 810 wrapped around a core 853. The spool 852 rotates to unwind the base material 810 therefrom. The base material 810 passes by the adhesive applicator 854 which is configured to apply adhesive on the base material 810. The adhesive applicator 854 can be a screen printer in a variety of embodiments. The screen printer 854 prints the adhesive on the base material 810 in a repeating, discrete pattern of a particular geometric shape, such as a square (shown in FIG. 5) or a circle (shown in FIG. 6).

The feeding device 860 is configured to dispense and deposit adsorbent beads 862 onto the adhesive. A hopper 858 stores and dispenses the adsorbent beads 862 to the feeding device 860. In a variety of embodiments the feeding device 860 is a vibratory feeder, which randomly dispenses the adsorbent beads 862 to be in contact with the adhesive. The feeder 860 can transport the adsorbent beads 862 to the base material 810 with the adhesive. The adsorbent beads 862 that contact the adhesive become coupled to the adhesive and, therefore, the base material 810. In an embodiment, the excess adsorbent beads 861 that do not make sufficient contact with the adhesive are collected and returned to the hopper 858.

In at least one embodiment, the base material 810 having the adhesive is translated past a heater 856, which is configured to keep the adhesive soft before the adsorbent beads are deposited thereto. The heater 856 can be an infrared heater, for example. In some embodiments, no heater 856 is used.

In a variety of embodiments, including that depicted in FIG. 8, the adsorbent beads are dispensed to be in contact with the adhesive and fed between two rollers 866 864. A first roller 864 is paired with a driven roller 866, in a variety of embodiments. In one embodiment the first roller 864 is an extra soft nip roller, although the first roller 864 can be other types of rollers, as well. The two rollers 864, 866 apply pressure to the adsorbent beads 862 and the base material 810 to increase the adhesion of the beads 862 to the base material 810. The sub-assembly 812, which is the base material 810 having the adhesive and adsorbent beads 862, can be wound around a second core 869 to form a second spool 868. The base material 810 is wound in a substantially spiraled configuration. The second spool 868 can store the base material 810 until the base material 810 is needed for further manufacturing processes.

Figure 9:
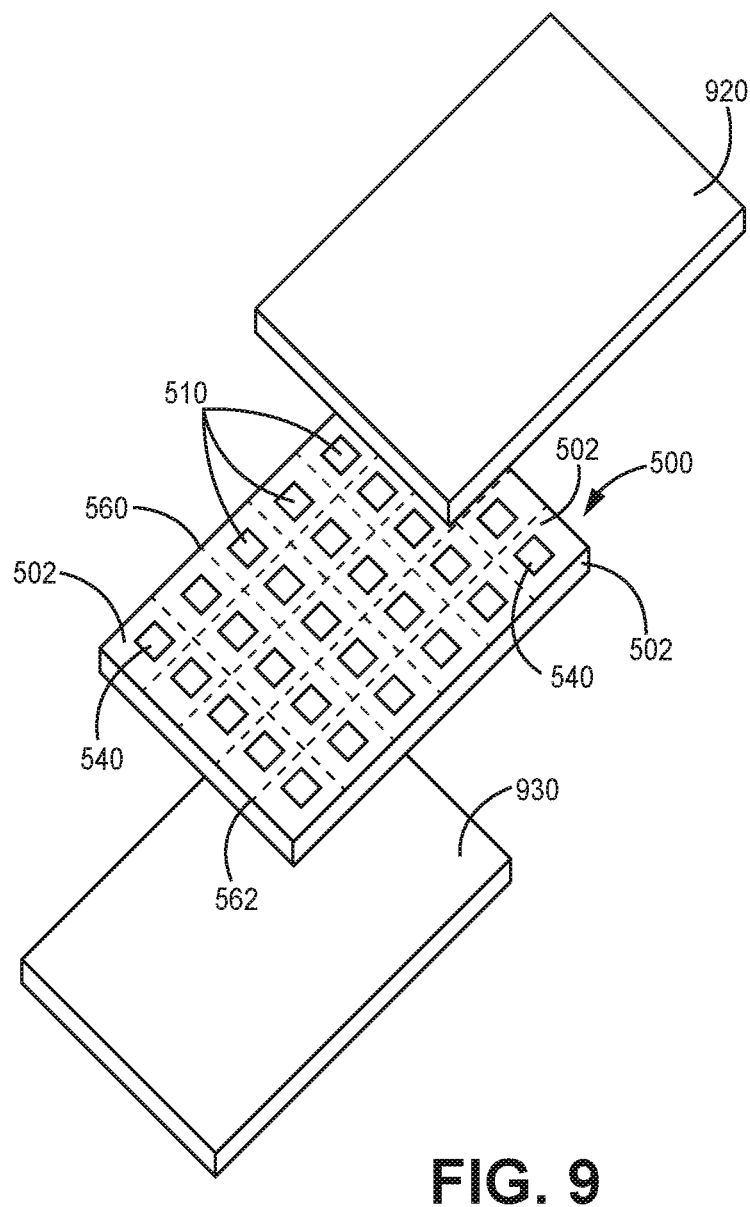
FIG. 9 is an exploded view of a filter manufacturing assembly, according to an embodiment.

FIG. 9 shows exploded view of a filter manufacturing assembly that uses the sub-assembly 500 described with reference to FIG. 5. A base layer 502 that defines a plurality of conjoined first layer sections 510 is disposed between a second layer 920 and a third layer 930. In a variety of embodiments, the base layer 502 is an elongate sheet of material, for example, which has been described above. In a variety of embodiments the second layer 920 and the third layer 930 are each a sheet of filter material, such as one or more electrostatic filter materials. As such, the "second layer" can be referred to as a "first filter layer" and the third layer 930 can be referred to as a "second filter layer."

Adhesive is coated on the surface of a base layer 502 in a repeating, discrete pattern of a geometric shape 540. In some embodiments the coating of adhesive within the geometric shape 540 is a substantially continuous coating. In a variety of embodiments, the coating of adhesive within the geometric shape 540 is non-continuous in nature, and can define randomized or patterned adhesive dots, beads, strips or lines, for example. The non-continuous coating of adhesive can also define a cross-hatching configuration, in some embodiments. The coating of adhesive is non-continuous so as to allow airflow through the base layer 502. Generally the adhesive will cover less than 50%, 40%, and 30% of the surface area of each geometric shape. In some embodiments the adhesive will cover less than 20% or even 10% of the surface area of each geometric shape.

A plurality of adsorbent beads 550 are coupled to the adhesive areas 540. The adsorbent beads 550 and adhesive areas 540 are configured to define, for example, the eventual central regions of each of the resulting filter assemblies (see element 104 FIG. 2, for example, and element 304 of FIG. 3). The base material 502 between the geometric shapes defines a bonding region that can be substantially free of adsorbent beads. The bonding region is generally configured to be the perimeter region of each resulting filter assembly (See element 102 of FIG. 2, for example).

In some example methods, a first filter layer, such as a second layer 920, is applied over the first surface of the manufacturing sub-assembly 500. Applying the first filter layer 920 over the sub-assembly 500 can retain the adsorbent beads 550 between the base layer 502 and the first filter layer 920, such that the adsorbent beads are disposed between the base layer 502 and the first filter layer 920. The first filter layer 920 and the base layer 502 are bonded or otherwise coupled together in the bonding region. Similarly, the second filter layer 930, such as the third layer, is applied on the opposite surface of the manufacturing sub-assembly 500. In embodiments consistent with FIG. 3, for example, the second filter layer 930 can also help retain adsorbent beads between the base layer 502 and the second filter layer 930. In other embodiments, such as those consistent with FIG. 2, the second filter layer 930 does not retain adsorbent beads. The second filter layer 930 and the base layer 502 are bonded or otherwise coupled together in the bonding region.

The base layer material 502 of the sub-assembly 500, the second layer 920, and the third layer 930 are bonded together in the bonding region. The layers 502, 920, 930 can be bonded in a variety of ways such as with one or more adhesives. In some embodiments the layers are bonded by heat or ultrasonic welding, which can prevent fibers in each of the layers from becoming loose. In a variety of embodiments, the base layer 502, first filter layer 920 and second filter layer 930 are stacked together and welded in the bonding region in a single step.

In a related embodiment of a method, the second filter layer 930 and the first filter layer 920 can be a single sheet. The single sheet, that has the first filter layer and the second filter layer, can be folded over to sandwich the sub-assembly 510 there between. The first filter layer 920, the second filter layer 930, and the base layer 502 can be substantially coextensive at least in the regions of the sub-assembly 500 that define the central regions having adhesive and adsorbent beads. The first filter layer 920, the second filter layer 930 and the base layer 502 are coupled or bonded together in areas that are substantially between the plurality of discrete geometric shapes on the first surface of the base layer and the second surface of the base layer.

After the three layers 502, 920, 930 are bonded together, individual filter assemblies, such as shown in FIGS. 1-3, can be separated from each other. The individual filter assemblies can be separated from each other, for example, by cutting through the first filter layer 920, the second filter layer 930, and the base layer 502 in the bonded region. Cutting along the portions of the first filter layer and the base layer that are bonded together can avoid cutting through the enclosure containing the adhesive and adsorbent beads or, such that the cutting occurs between the plurality of discrete geometric shapes.

Processes consistent with the technology disclosed herein generally result in increased adsorbent within the filter assembly, which can improve the adsorbent capacity of the filter. For example, smaller manufacturing tolerances are required in the above-described processes compared to introducing a separate adsorbent component to be contained within filter media. Furthermore, processes consistent with the technology disclosed herein can also result in a more streamlined, simplified manufacturing process. For example, multiple cutting steps can be eliminated compared to some existing processes.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The current technology has been described with reference to various specific and preferred embodiments and techniques. However, it should be understood that many variations and modifications may be made while remaining within the spirit and scope of the technology.

The invention claimed is:

1. A filter assembly comprising:
   a first layer comprising a base layer defining a first perimeter region and a region central to the first perimeter region, a first adhesive disposed on a first surface of the first layer substantially within the central region, and first adsorbent beads coupled to the first adhesive, wherein the first perimeter region substantially lacks adhesive;
   a second layer comprising a first sheet of filter material having a second perimeter region, wherein the first perimeter region and the second perimeter region are bonded; and
   a third layer comprising a second sheet of filter material having a third perimeter region, wherein the first perimeter region and the third perimeter region are bonded, and wherein the base layer, second layer, and third layer are substantially coextensive, wherein each of the first layer, second layer and third layer has an outer perimeter, wherein the second layer and the third layer comprise electrostatic filter media.

2. The filter assembly of claim 1, further comprising a second adhesive disposed on a second surface of the first layer substantially within the central region, and second adsorbent beads coupled to the second adhesive, wherein the second perimeter region substantially lacks adhesive.

3. The filter assembly of claim 2, wherein the first adhesive and the second adhesive are different types of adhesive.

4. The filter assembly of claim 1, wherein the base layer comprises polypropylene fibers.

5. The filter assembly of claim 1, wherein the base layer comprises knit polyester.

6. The filter assembly of claim 1, where the second layer comprises a membrane.

7. The filter assembly of claim 1, wherein the first perimeter region, the second perimeter region and the third perimeter region define a weld area and wherein the weld area is substantially free of the adsorbent beads.

8. The filter assembly of claim 1, further comprising an electrostatic layer coupled to the first layer.

9. A method of making a filter assembly comprising:
   providing a base layer having a first surface and a second surface;
   pattern coating a first adhesive onto the first surface of the base layer, wherein the first adhesive defines a repeating pattern of a particular discrete geometric shape, and wherein within each discrete geometric shape the first adhesive is non-continuous;

applying a first filter layer over the first surface of the base layer;

coupling the base layer to the first filter layer substantially between the discrete geometric shapes; and cutting through the first filter layer and base layer between the discrete geometric shapes.

10. The method of claim 9, further comprising depositing a first plurality of adsorbent beads on the first adhesive coating.

11. The method of claim 9, further comprising pattern coating a second adhesive onto the second surface of the base layer, wherein the pattern is substantially similar to, and substantially aligned with, the pattern coating on the first surface of the base layer.

12. The method of claim 11, further comprising depositing a second plurality of adsorbent beads on the second adhesive coating.

13. The method of claim 9, further comprising:

applying a second filter layer over the second surface of the base layer; and coupling the base layer to the second filter layer substantially between the discrete geometric shapes.

14. The method of claim 10, further comprising compressing the adsorbent beads into the adhesive.

15. The method of claim 14, wherein compressing the adsorbent beads comprises translating the base layer through nip rollers.

16. The method of claim 14, further comprising winding the base layer with the adsorbent beads onto a spool.

17. The method of claim 10, wherein pattern coating comprises passing the base layer through a screen printer.

18. The method of claim 10, further comprising translating the adhesive past a heater prior to depositing of the first plurality of adsorbent beads.

19. The filter assembly of claim 1, wherein the first adhesive is non-continuous within the central region.

20. A filter assembly comprising:

a first layer comprising a base layer defining a first perimeter region and a region central to the first perimeter region, a first adhesive disposed on a first surface of the first layer substantially within the central region, and first adsorbent beads coupled to the first adhesive, wherein the first perimeter region substantially lacks adhesive;

a second layer comprising a first sheet of filter material having a second perimeter region, wherein the first perimeter region and the second perimeter region are bonded;

a third layer comprising a second sheet of filter material having a third perimeter region, wherein the first perimeter region and the third perimeter region are bonded, and wherein the base layer, second layer, and third layer are substantially coextensive, wherein each of the first layer, second layer and third layer has an outer perimeter; and an electrostatic layer coupled to the first layer.

* * * * *